April 22, 1969  C. D. CARDOSO  3,439,719
CASHEW-NUT PEELING MACHINE

Filed May 4, 1965  Sheet 1 of 5

INVENTOR
CARLOS DUARTE CARDOSO
BY Steinberg & Blake
ATTORNEYS 3,439,719
CASHEW-NUT PEELING MACHINE
Carlos Duarte Cardoso, Castanheira do Ribatejo, Portugal, assignor to Sodescal-Sociedade de Maquinas de Descasque, Ltda., Lisbon, Portugal
Filed May 4, 1965, Ser. No. 453,052
Claims priority, application Spain, May 11, 1964, 299,709; Apr. 6, 1965, 311,491
Int. Cl. A23n 5/08, 5/00
U.S. Cl. 146—10                    17 Claims

ABSTRACT OF THE DISCLOSURE

A nut-shelling machine, such as a machine for automatically shelling cashew-nuts. The machine includes a plurality of pairs of opposed claw heads, and these pairs of opposed heads are uniformly distributed about a main axis of the machine, with each pair of opposed claw heads having a common head axis which is parallel to the machine axis. During operation of the machine all of the pairs of opposed claw heads rotate about the main axis of the machine and each pair of opposed claw heads are simultaneously moved first toward each other and then away from each other during rotary movement about the main axis. Each claw head carries a plurality of claws extending inwardly beyond each claw head where each claw terminates in an inner piercing end capable of piercing through a nut shell, so that these inner piercing ends of the claws carried by each pair of opposed heads are situated between the pairs of opposed heads. The claws of each head are supported thereby at locations uniformly distributed about the axis of the head with the inner piercing ends of the claws directed toward the head axis, and the claws are pivotally carried by each head for inward swinging piercing movement toward the head axis and for outward releasing movement away from the head axis. A cam means is carried by each head and coacts with the claws thereof for swinging the claws inwardly toward the head axis, to bring about piercing of the shell, in response to axial movement of the pair of opposed heads toward each other and for swinging the claws of each head outwardly away from the head axis in response to axial movement of each pair of opposed heads away from each other, so that in this way a shell which is engaged by the piercing ends of the claws will be pierced thereby and split into shell halves which are retracted by the claws and then dropped therefrom as the claws are swung outwardly away from the head axis during their outward releasing movement. A pair of coaxial holding bars are respectively surrounded by each pair of opposed heads and have a common axis coinciding with the head axis, and these bars hold a nut while it is acted upon by the claws.

---

This invention relates to a machine for shelling cashew-nuts, the working of which is fundamentally based upon the simultaneous opposed movements of pairs of claw-carrying heads, pairs of blocking bars being placed along the axis of the heads, with each bar containing a perforating rod also extending along the axis.

The claw-carrying heads, the blocking bars and the perforating rods all have, consequently, a common horizontal axis and their respective movements are opposed and only of translation between two positions of maximum and minimum distance between each pair of pieces.

The claws with which the heads are provided achieve radial opening and closing movements simultaneously with these opposed axial translation movements of the heads, of the blocking bars and of the perforating rods, closing the claws when the heads of each pair get close and opening when the heads of each pair get apart. It is these movements that allows the achievement of the operation of shelling cashew-nuts in a simple and efficient way. Thus, the blocking bars of each pair of heads take and carry a cashew-nut while the machine turns through one revolution; the claws, closing, achieve the opening of the shell into two halves, the perforating rods perforate the two halves of the shell and separate the kernel from the half shell in which it remains and the claws, by opening, release the two halves of the shell. All these movements are achieved while the heads revolve around the main axis of the machine and are controlled by appropriate devices in response to the rotational movement. The sequence of these movements during one revolution of the machine and the different elements are schematically shown in the drawings which illustrate an embodiment of the present invention for the industrial realization of the machine, only included here for illustrative purposes.

In the drawings, FIG. 1 shows schematically the initial position in which the claw-carrying heads, the blocking bars and the perforating rods are at the maximum distance from each other.

FIG. 6 again shows the initial position.

Figure 7:
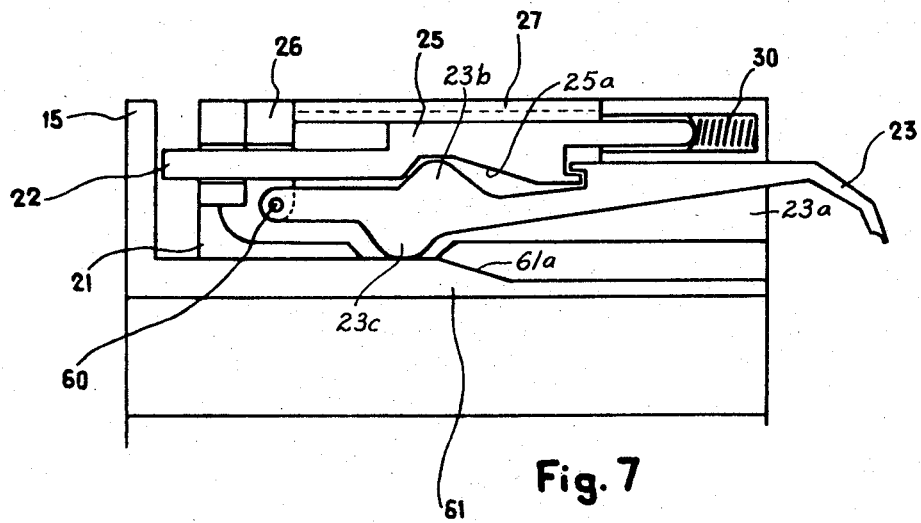

FIG. 7 shows schematically one of the claws with its corresponding driving mechanism.

Figure 8:
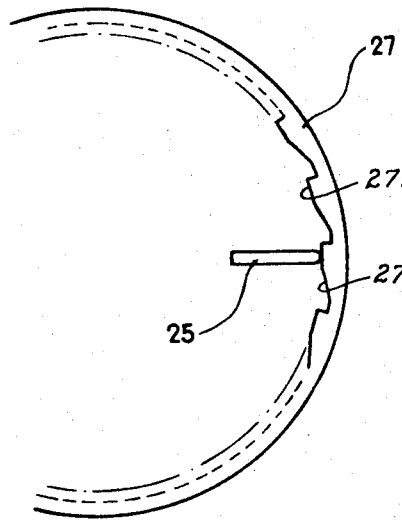

FIG. 8 is a fragmentary lateral view of the toothed drum.

Figure 9:
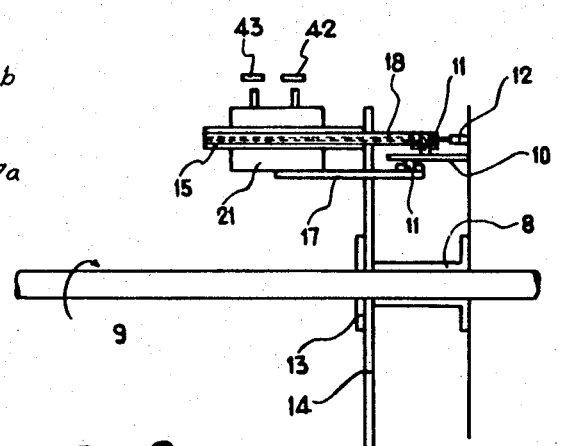

FIG. 9 shows schematically the relative positions of different fundamental elements.

Figure 10:
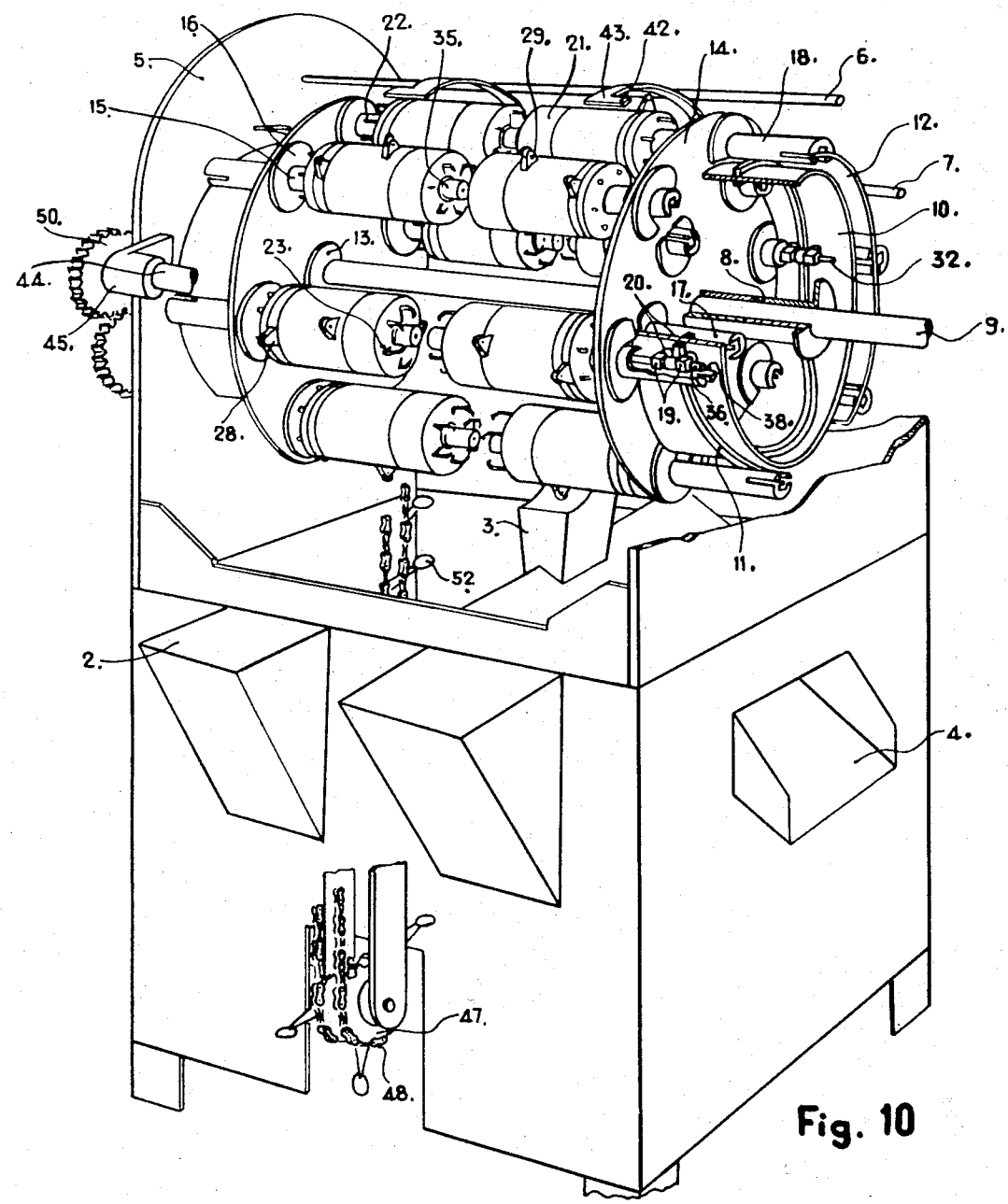

FIG. 10 is a perspective view showing the internal parts of a machine according to the present invention.

Figure 11:
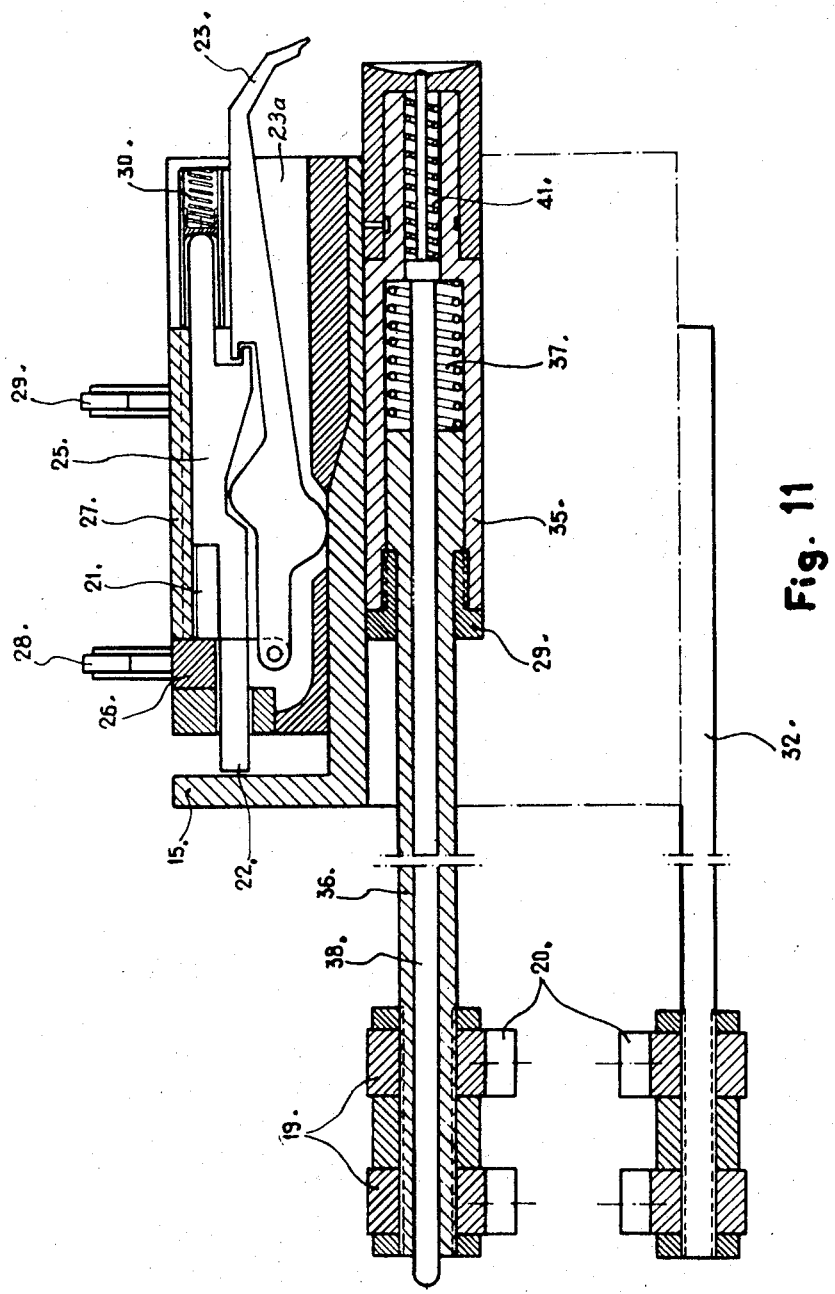

FIG. 11 is a longitudinal section of a claw-carrying head.

Figure 12:
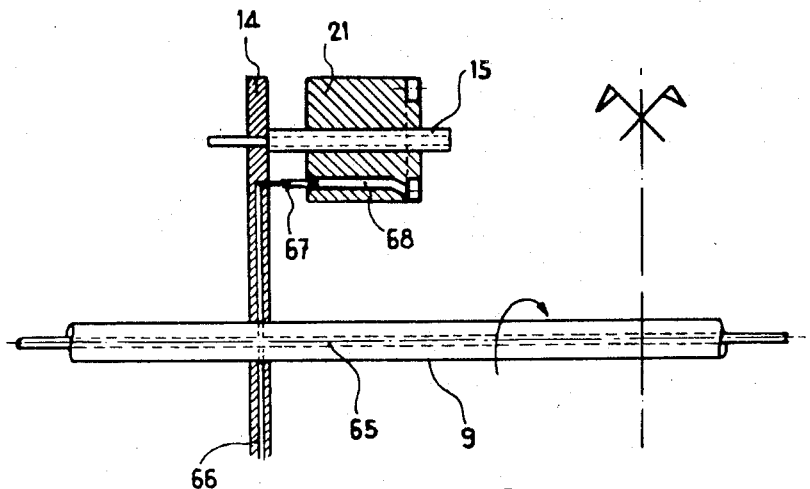

FIG. 12 is a schematic partly sectional elevation showing an embodiment of the invention which operates with compressed air.

Figure 13:
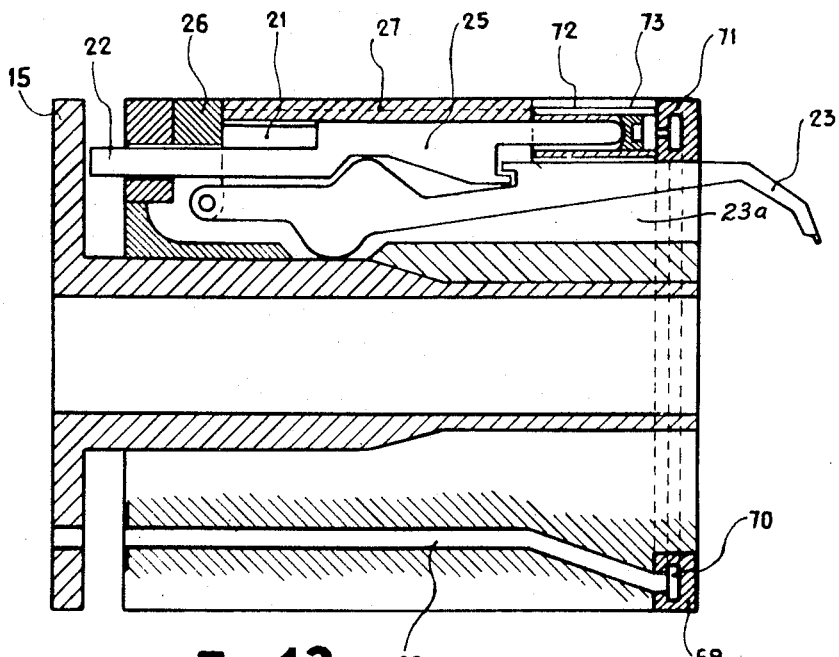

FIG. 13 is a longitudinal sectional elevation of a claw head of the embodiment of FIG. 12.

Figure 4:
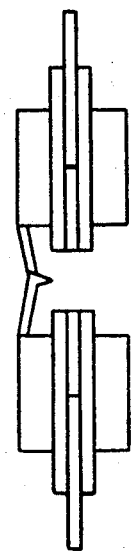
FIG. 4 shows the position in which both the claw-carrying heads and the blocking bars are in the minimum distance position and the perforating rods remain in the maximum distance position.
Figure 5:
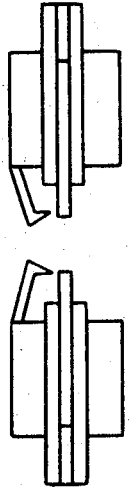
FIG. 5 shows the position in which the claw-carrying heads and the blocking bars are in a median position (moving from the minimum to the maximum distance) and the perforating rods are at a minimum distance from each other.
Figure 6:
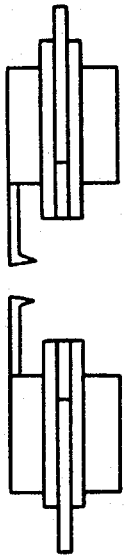
Figure 1:
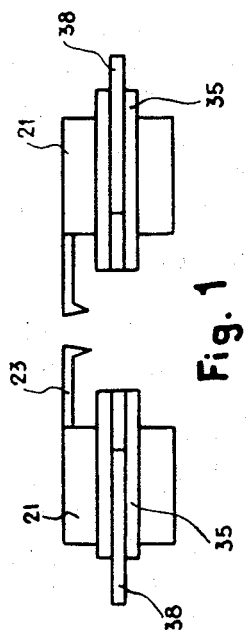
Figure 2:
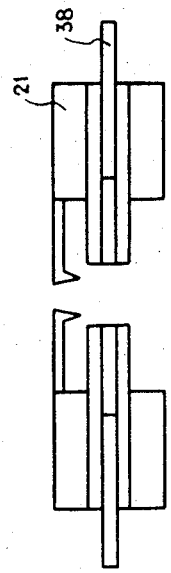
FIG. 2 shows the position in which the claw-carrying heads and perforating rods are still at their maximum distance from each other, but in which the blocking bars are in the minimum distance from each other.
Figure 3:
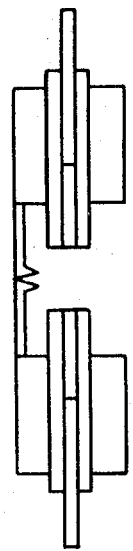
FIG. 3 shows the position in which the perforating rods are maintained at the maximum distance from each other, while the claw-carrying heads are in a median position (moving from the maximum to the minimum distance) and in which the blocking bars rmeain in the minimum distance position.

The radial movement of the ten claws, with which each head is provided, is achieved between the positions shown in FIGURES 4, 5 and 6 of the above-mentioned heads and in the way schematically explained below, with reference to the FIGURES 7 and 8 which schematically show one of the claws with the organs achieving movements by means of a device which is absolutely identical for all the ten claws:

The claws 23 are respectively mounted in grooves 23a (FIGS. 7 and 11) provided in the claw-carrying heads 21 and their movement, which takes place in four strokes, is transmitted to them by the wedges 25.

These wedges 25 contact with their external faces the internal surface of a toothed drum 27 (FIG. 8) which surrounds the head and which is provided with ten slopes 27a and ten plane sections 27b (one slope and one plane section for each claw) and are under the pressure of the springs 30 bearing on the front part of the claw-carrying head and lodged respectively in cylindrical cavities provided in the same.

The pressure of the springs 30 is maintained by the ring latch 26 which controls the rod portions 22 of the wedges 25, the latter being released by simple rotation of the ring latch. Thus, the ring latch 26 may simply have wedge-shaped latch teeth behind which correspondingly shaped latch teeth of the rod portions 22 are capable of snapping in a manner described below. The latching of the rod portions of the wedges, after the ring latch has rotated to its latching position, is effected by the pressure exerted on the rod portions by the fixed disk or flange 16 of each head guide 15.

The sequence of the four strokes of the claws is as follows:

FIRST STROKE

The ring latch 26, controlled from the outside, releases the rod portions 22 when the claw-carrying head is in the midst of its axial movement and thus moves away from the fixed flange 16, and the spring 30 pushes the wedge 25, the claw being released and free to rotate around its pivot pin 60.

SECOND STROKE

The spring 30 goes on pushing the wedge 25 and the latter slides at its internal inclined face 25a on the upper projection 23b to achieve the closure of the claw, which now has become positioned inwardly to the right of the tapered surface 61a of the sleeve portion 61 of the guide 15, as viewed in FIG. 7, and which revolves around its axis 60. The closing of the claw will depend from the resistance offered by the same and which is overcome by the spring 30. Thus, the force of the spring determines the strength with which the claw is closed and it can thus be said that it is an elastic closure.

As a reinforcement of the closing movement of the claws, the same becoming then rigid, that is, non-elastic, the wedge may move radially inwardly toward the head axis, moved by the toothed drum 27. This drum is externally controlled by turning about 36° and this causes the wedges 25 which bear upon it, to be pressed by the plane sections 27b and to move inwardly toward the head axis.

This movement of the wedge pushes the claw still further, closing it completely.

The complete closing of the claws may not necessarily be made and for this purpose it is sufficient to maintain the drum 27 motionless by disconnecting the respective external control.

THIRD STROKE

The external control of the drum 27 will make the same return to its initial position by reversing its revolution of about 36° which has been achieved during the second stroke, releasing the wedge, and the external control of the ring latch 26 will make it return to its initial position of blocking of the rod portions 22 of the wedges 25 which in the meantime are still released as they are subject to the pressure of the springs 30.

FOURTH STROKE

The claw-carrying head revolves to its initial position at the end of its axial movement and the rod portion 22 is then pushed by the fixed flange 16 by which the head becomes latched by the ring latch 26 which was already in its latching position. On its blocking movement, each wedge 25 compresses the spring 30 and no longer exercises any pressure on the upper projection 23b of the claws 23. During the same return movement of the head, the lower joint of the claw is forced to ascend the slope 61a which is provided on the sleeve 61 and thus will turn the claw around its axis 60, opening it and returning to the initial position.

The number of pairs of claw-carrying heads in the machine according to the present invention can be any number, depending only on the dimensions of the head-carrying plates, which are fundamentally constituted by two plates placed in parallel and rigidly fixed to the main shaft of the machine. The tubular guides 15 of the heads are fixed on these plates, each plate carrying a number of guides equal to the half of the total number of the claw-carrying heads.

The control of the movements of the axial translation of the claw-carrying heads, the blocking bars and the perforating rods, is achieved by links which by passing through the head-carrying plates, are guided by their ends rolling on guideways with the proper form for the simultaneous and periodic movement of each pair of pieces. Those guideways are provided on the internal and external surfaces of two guide drums, at each end of the machine behind the head-carrying plate.

The control of the movements of the claws is achieved by two small rolls, placed on each claw-carrying head, these rolls advancing along two tracks fixed to the structure of the machine and each one of them having a cylindrical surface, the axis of which is in coincidence with the axis of the machine.

In FIGURE 9 are schematically shown the relative positions of the different fundamental organs which are the main shaft 9 of the machine with the respective bearings 8, the head-carrying plates 14 fixed to the main shaft by means of flanges 13, the guide drums 10, the claw-carrying heads 21 with the respective tubular guides 15, the links 18 controlling the movement of the blocking bars, the links 17 controlling the movement of the claws, and the abutment 12 controlling the movement of the blocking bars and the heads.

The operation of shelling cashew-nuts is achieved by each pair of opposed heads, at the rate of one nut per revolution. Thus, a machine provided with $n$ pairs of heads will peel $n$ nuts per revolution, and the speed of 40 revolutions per minute is considered as the average speed of the machine.

Beside the above mentioned organs, the machine is also provided with some other organs the constitution and working of which are not specified, as being obvious, the same concerning the coordination of the different movements and the connection of the main pieces.

The operation of shelling a nut by this machine according to the present invention is achieved in the following way:

By means of a simple elevator the nut is placed between one of the pairs of heads and is held by two blocking bars which keep the nut blocked during the transport. When the movement of translation of the heads begins the claws are set into motion, bear upon the nutshell and, closing still more, start to break the shell which will then split in two parts, one remaining in each claw unit, whereupon the blocking bars are withdrawn. Meanwhile the perforating rods perforate the halves of the shell, piercing each one of them to push the kernel that eventually has remained stuck to a half-shell. The kernel, thus separated, falls down and the two shells fall down subsequently, when the claws open completely.

The shelling cycle as above specified, is achieved during one half revolution, that is, each pair of heads receives the nut in a horizontal plane containing the main axis of the machine, and releases the shells and the kernel about 180° afterwards.

FIGURES 10 and 11 represent in its fundamental aspects an example of a machine built according to the present invention, having in this particular case six pairs of heads, this being equivalent, as already stated, to the shelling of six nuts per revolution of the machine.

This machine is essentially composed of the following elements:

(a) Machine foundation 1 formed by a metallic structure of prismatic quadrangular shape, plate-covered, with the bottom forming an inverted pyramid, also plate-covered, and constituting a feeding hopper, comprising the chute 2 for the entrance of the nuts, the chute 3 for the exit of the kernels and the chute 4 for the exit of the shells.

(b) Frame formed by two rectangular standard plates 5 which are plane and rounded at their upper part. These standards are duly reinforced below and fastened one to the other on the top by two cylindrical struts 6 and 7. The bearings 8 of the main shaft 9, the supports 10 of the helicoidal tracks 11 and the abutments 12 which move the perforating rods are mounted on the standards.

(c) Main shaft 9 made of steel, cylindrical, with two free flanges 13, by means of which the head-carrying plates and the guides 14 are fixed to the shaft. On one of its extremities the shaft is driven by an engine (usually an engine-reducer group of variable speed) and on its other extremity is mounted the transmission of the motion to the feeding device.

(d) Head-carrying plates, heads and guides 14 formed by disks of iron-sheet, connected by screws to the flanges 13. The links 36 controlling the movement of the blocking bars and the links 32 controlling the movement of the heads, pass through the apertures existing in these disks.

(e) Guides of the heads 15, the purpose of which consists in supporting the heads in their axial movement of translation, these guides being formed by tubular pieces fixed to the head-carrying plates by means of flanges 16.

(f) Guides 17 of the die blocks controlling the movement of the heads, formed externally by cylindrical pieces having an internal square section; these are fixed to the head-carrying plates by their ends shaped like flanges.

(g) Guides 18 of the die-blocks controlling the movement of the blocking bars, of a constitution similar to guides 17, but having grooves on their free end, allowing the abutments 12 of the perforation rods to pass through them.

(h) Die-blocks 19 with small rolls 20 which are working in the guides 17 and 18 and are quadrangular perforated pieces, allowing the passage of the links 32 and 36 controlling the axial movements of translation of the heads and of the blocking rods, and also provided with cylindrical pins where enter the rolls 20. These die-blocks are mounted in pairs fixed by means of nuts on the transmission links of the movements in such a way that the respective rolls remain one on each side of the helicoidal tracks 11.

(i) Claw-carrying heads, being the heads formed by the following pieces:

a cylindrical body 21 with grooves and channels for the passage of the rod portions 22, partially surrounded by the toothed drum 27;

ten claws 23 working in open grooves or boxes in the cylindrical body 21;

ten wedges 25 with the rod portions 22 for controlling the claws;

a ring latch 26 which holds and releases simultaneously all the rods;

a toothed drum 27 controlling the movement of the claws 23 by means of the wedges 25;

a roll 28 to operate the ring latch 26;

a roll 29 to operate the drum 27;

ten springs 30 exercising pressure upon the wedges and displacing them as soon as the ring latch releases the rod portions of the wedges;

a link 32 for the transmission of the movement of the die-blocks to the head; achieving the axial translation of the same.

(j) Blocking bars, composed as follows:

a cylindrical body 35 axially bored, forming the actual blocking bar and terminating at one end in a shell shaped cavity;

a link 36 for controlling the movement of the blocking bar;

a main spring 37 in order to make elastic the progress of the blocking bar;

a perforating rod 38;

a nut 29 for closing the whole device;

a spring 41 for returning the perforating rod to its first position.

(k) Guide drums 10 with helicoidal tracks controlling the translation movements of the heads and of the blocking bars.

(l) Abutments 12, for operating the perforating rods, are constituted by pieces in shape of circular segments.

(m) Abutments 42 and 43 for the controlling of the ring latch 26 and the toothed drum 27 through rolls 28 and 29, the return of which after passing the abutments is achieved by the springs connected to the body of the head.

(n) Feeding group formed by:

a shaft two bearings two toothed wheels 47 working one as a motor or driving wheel and the other as a driven wheel a chain 48 of transport shells.

This group is operated from the main shaft by means of a chain transmission and has a pair of gear wheels, allowing the reversal of the drive.

The chain of shells passes at the bottom of the feeding hopper through a guiding tube.

This machine works as follows:

Starting the machine, the main shaft 9 rotates and also starts to rotate the head-carrying plates and the guides 15 which are rigidly connected to the shaft 9. The heads will also accompany this rotary movement as they are mounted on the respective guides 15 which are themselves rigidly connected with the head-carrying plates 14. Besides this movement of rotation the heads also execute the opposing movement of axial translation which is transmitted to them 11 through the helicoidal tracks by the devices already described. In the same way the blocking bars 35 and the perforating rods 38 simultaneously execute the continuous rotating movement and the opposing movement of axial translation.

On the other hand the claws mounted in the heads are moving, closing and opening successively.

At the same time the feeding system starts moving and each shell carries a nut which, through the synchronization of the movements, is placed between the blocking bars 35 of each pair of heads 21 which hold the nut, following the operations schematically described and detailed as follows:

Thus as the head-carrying plates are revolving, the dies with rolls will slide on the helicoidal tracks 11 producing the translation movement of the heads which move toward each other, as well as the extremities of the claws, the claws of each head being situated in the intervals between the claws of the opposite head.

As the head-carrying plates proceed with their rotating movement, the rolls 28, 29 touch the respective abutments 43, 42, one opening the ring latch 26 and the other one displacing the drum 27; thus by means of wedges 25 the claws are applied to the nut and afterwards pierce through into the shell splitting it in two. After the claws pierce the nutshell the heads together with the blocking rods 35 are separated one from the other each carrying one half of the shell retained by the respective claws. As the separating movement of the heads is carried out, the perforating rods 38 abut on the abutments 12 obliging them to proceed perforating the half shells from the outside to the inside for dropping the kernel, if this has not already dropped, which falls through the exit chute.

As the revolving movement of the head-carrying plates proceed and as the heads remain separated, the rod portions 22 of the wedges 25 will meet the rear flange 16 of the guides 15 of the heads, due to the action of tracks 11 on links 32, to displace the wedges back to their initial position, pressing the springs 30 and stopping the pressure upon the claws, the bottom projection 23c of which by rising along the tapered portion 61a to the zone of largest diameter of the guide 15 opens the claws thus releasing the shells which fall into the exit chute 4.

This operation is successively repeated in the described machine with a repetition of six times per revolution, in the case where there are six pairs of heads.

An improved embodiment of the object of the present invention, as may be deduced from what will be described below, does not in any way alter the essential principles of the invention, or the working of the main organs of the respective machine—the claws 23.

Indeed, this improvement consists only in the substitution for the spring 30 by a device which, as will be described with reference to the FIGURES 12 and 13 of the appending drawings, allows that the action exerted by this spring will instead be effected by compressed air, the same being fed to the frontal part of the heads 21 through conduits situated in the main shaft of the machine, in the head-carrying plates and in the bodies of the superior part of the heads, the connection between the head-carrying plates and the bodies of the heads being effected by telescopic tubes.

FIG. 12 shows schematically the different organs of the machine which are important for the embodiment of the improvements displayed in this alternative form, which are the following ones:

the axial bore 65 which extends longitudinally through the main shaft 9 of the machine and which at one of its extremities, or at both of them, is connected to the compressed air source by a classical mano-reducer;

the cylindrical radial bores 66 on each head-carrying plate 14 (one radial bore for each head) which are in direct communication with the axial bore 65;

the telescopic tubes 67 (one for each head) which provide the connection between the radial bores 66 of the head-carrying plates 14 and the cylindrical bores 68 provided in each head.

FIG. 13 shows schematically a section of a head in which is indicated the position of the compressed air conduits in the same.

Each head is longitudinally bored by a cylindrical perforation 68 which ends in the air collector 69.

The air collector 69 is constituted by a cylindrical piece fixed on the frontal part of each head with an internal cavity 70 forming a circular space, from which, by means of small cylindrical perforations 71, with their axes parallel to the axis of the head, is effected the feeding of the cylinders 72, where are working small pistons 73, which push the wedges 25.

From the description above of this improvement may therefore be seen that the same consists only, as already has been said, in making the wedges 25 work through the action of compressed air, instead of being moved by means of springs, as formerly stated.

Therefore the essential principles of the functioning of the cashew-nut shelling machine are not altered by this improvement, having only improved its embodiment, it being evident that the below indicated advantages are the result of the use of compressed air instead of springs:

elimination of one organ—the spring—which is liable to failures and wear as time goes on;

extensive regulation of the energy of the closure of the claws through the very simple regulation of the air pressure which is supplied to the machine;

facilitating of machine-cleaning, because the outlets of compressed air of the system provide draughts which eliminate from the heads the impurities which are set free with the introduction of the claws.

It is to be noted also that from the economical point of view an important improvement of the machine according to the present invention is achieved, for, with a minimum of consumption of compressed air—only the amount is necessary in order to compensate for losses—an appreciable saving in the maintenance is obtained, that is, eliminating the necessity of replacing the springs, and additionally, a great economy in the exploitation, because the idle periods of the machine are lessened and the regulation of the piercing can be done while the machine operates, the regulation of the pressure of the compressed air being sufficient.

Thus, it will be seen that with the structure of the invention the main shaft 9 together with the plates 14 and guide sleeves 15 which are fixed thereto form a pair of rotary support means having a common axis which defines the main axis of the machine and which coincides with the axis of the shaft 9. This pair of rotary support means support the plurality of claw heads 21 for rotary movement together with the rotary support means as well as for axial movement toward and away from each other, these heads 21 of course forming pairs of opposed heads with each pair of opposed heads having a common head axis which is parallel to the main axis formed by the axis of the shaft 9. The several pairs of opposed heads 21 are uniformly distributed about the main axis of the machine and rotate together about this main axis while at the same time the control means which is formed by such structures as the helicoidal tracks 11 and the parts which cooperate therewith act to displace the pairs of opposed heads toward and away from each other in response to rotary movement about the axis of the shaft 9. Each head 21 carries a plurality of claws 23, and the several claws 23 of each head terminate inwardly beyond each head in ends which form piercing means, respectively, for piercing through the nut shells, as is apparent from the above description, so that the plurality of piercing means at the inner ends of the claws 23 are situated between the pairs of opposed heads. The pivot pins 60 form a pivot means for pivotally supporting the several claws of each head for inward swinging piercing movement and for outward swinging releasing movement, and the wedges 25 as well as the toothed drum 27 and the sleeve 61 form together with the projections 23b and 23c of each claw 23a cam means camming the claws 23 inwardly as the pairs of opposed heads move toward each other and outwardly as the pairs of opposed heads move away from each other. A yieldable pressure means, formed either by the springs 30 or by the air pressure in the embodiment of FIGS. 12 and 13, acts to tend to displace the claws inwardly along their swinging piercing movements, and of course, each latch ring 26 forms a latch means for releasably retaining the several wedges 25 of the cam means in their initial starting positions in opposition to the pressure means formed by the springs 30 or the pressure in the case of FIGS. 12 and 13.

Each pair of opposed heads surrounds a coaxial pair of holding bar means formed by the holding bars 35 which have a common axis coinciding with the common head axis of each pair of opposed heads, and of course the rods 38 form a perforating means for perforating the shells after they have been pierced through by the inner piercing ends of the claws and separated from each other, so that the perforating means 38 are capable of displacing the kernels if they should happen to cling to the separated shell portions. The conveyor 48 forms a feed means for feeding the nuts into the space between the pairs of coaxial holding bar means 35, and of course the various discharge chutes form guides for the empty shells and for the kernels.

What is claimed:

1. In a nut shelling machine, a pair of mutually spaced rotary support means having a common main axis of rotation, a plurality of pairs of opposed claw heads sit-opposed heads at the end of their inward movement toward each other situating said piercing means at said inner ends of said claws at locations where the piercing uated between and carried by said pair of rotary support means, each pair of opposed heads having a common head axis parallel to said main axis and said pairs of opposed heads being distributed about said main axis and carried by said pair of rotary support means for rotation about said main axis, said pair of support means also supporting each pair of opposed claw heads for axial movement along the common head axis toward and away from each other while said heads rotate about said main axis, a plurality of claws carried by each head and being circumferentially distributed about its head axis, the claws which are carried by each pair of opposed heads extending inwardly toward each other beyond each pair of opposed heads and terminating in a space between each pair of opposed heads in inner piercing means situated at inner ends of said claws, respectively, and directed toward said head axis, pivot means carried by each head for swingably supporting said claws carried thereby for inward piercing movement toward said head axis and for outward releasing movement away from said head axis, control means coacting with said heads for axially advancing each pair of opposed heads along their common head axis first toward each other and then away from each other during rotation of each pair of opposed heads around said main axis, cam means carried by each head and coacting with said claws carried thereby for swinging said claws inwardly while each pair of opposed heads approach each other and outwardly while each pair of opposed heads move away from each other to bring about piercing and releasing of a shell in response to rotary movement of said heads about said main axis, and a pair of coaxial holding bar means surrounded by each pair of opposed heads for holding a nut while said claws act thereon, each pair of coaxial holding bar means having a common axis coinciding with the common head axis of each pair of opposed heads and said pair of rotary support means also supporting said holding bar means for rotary movement together with said heads about said main axis.

2. The combination of claim 1 and wherein said control means also coacts with said pairs of holding bar means for axially displacing each pair of coaxial holding bar means along their common axis first toward each other to a nut-holding position and then away from each other to a nut-releasing position during rotation of said plurality of holding bar means with said plurality of heads about said main axis.

3. The combination of claim 2 and wherein a pair of spring means respectively coact with each pair of coaxial holding bar means for providing a yieldable, resilient engagement of a nut thereby.

4. The combination of claim 1 and wherein a yieldable pressure means coacts with the plurality of claws carried by each head for yieldably pressing the claws inwardly during their inward swinging piercing movement, said yieldable pressure means acting through said cam means on said claws.

5. The combination of claim 4 and wherein said yieldable pressure means includes a plurality of springs.

6. The combination of claim 5 and wherein said yieldable pressure means is a fluid pressure means which applies the pressure of a fluid through said cam means to said claws.

7. The combination of claim 1 and wherein the claws carried by one of each pair of opposed heads are axially aligned with the spaces between the claws carried by the other of each pair of opposed heads, and each pair of means at the inner ends of the claws carried by one of said pair of opposed heads alternate around a nut in the spaces between the piercing means carried by the inner ends of the claws carried by the other of the pair of opposed heads.

8. The combination of claim 1 and wherein a pair of perforating means are respectively carried by each pair of coaxial holding bar means for perforating shells held by said claws as each pair of opposed heads move apart from each other, so that said perforating means will displace a kernel from a shell to which it may cling.

9. The combination of claim 8 and wherein each pair of perforating means are respectively in the form of a pair of elongated perforating rods, said pair of holding bar means being in the form of elongated bars which are axially bored to receive said perforating rods.

10. The combination of claim 9 and wherein said control means coacts with said plurality of holding bar means for moving each pair of holding bar means toward each other to a nut-holding position and away from each other to a nut-releasing position in response to movement of each pair of holding bars around said main axis, and said control means also coacting with said perforating rods for advancing each pair of coaxial perforating rods through nut shells held by said claws while each pair of holding bars move apart from each other while each pair of opposed heads move apart from each other.

11. The combination of claim 1 and wherein said control means includes for each of said pair of rotary support means a stationary cylindrical support coaxial with said main axis, a helicoidal track carried by said stationary cylindrical support, and for each head a pair of rollers engaging said track, and a link operatively connected to said rollers and connected to each head for rotary movement therewith about said main axis, so that in response to the rotary movement about said main axis each head will be axially advanced and retracted by the action of said helicoidal track.

12. The combination of claim 11 and wherein each cylindrical support carries a second helicoidal track of said control means, a second pair of rolls engaging said second helicoidal track, and a second link connecting said second pair of rolls to each holding bar means for controlling the axial displacement of the latter from said second track.

13. The combination of claim 12 and wherein said tracks are respectively situated at inner and outer surfaces of said cylindrical support.

14. The combination of claim 13 and wherein a pair of perforating rods are respectively carried by and extend along the common axis of each pair of holding bar means, the latter being axially bored to accommodate said pair of perforating rods, and said perforating rods being controlled also by said control means for piercing through shells carried by said claws as each pair of opposed heads move apart from each other, said control means including stationary tracks slidably engaging outer ends of each pair of coaxial perforating rods for controlling the movement of the latter during rotation of said pair of rotary support means.

15. The combination of claim 1 and wherein a feed means coacts with said pairs of coaxial holding bar means for automatically feeding a nut into the space between each pair of coaxial holding bar means to be engaged and held thereby.

16. The combination of claim 1 and wherein a yieldable fluid pressure means acts through said cam means on said claws for swinging the latter inwardly toward said head axis during their inward piercing movement, said yieldable pressure means including pistons acted upon by compressed air for directing the force of the latter to said cam means.

17. The combination of claim 16 and wherein said pair of rotary support means and said heads are formed with bores coacting to provide passages for compressed air to said pistons.

References Cited

UNITED STATES PATENTS

| 1,510,575 | 10/1924 | Anthony et al. | 146—12 |
| 2,524,646 | 10/1950 | Adamopoulos | 146—12 |
| 2,690,196 | 9/1954 | Swearinger et al. | 146—10 |

GRAYDON ABERCROMBIE, *Primary Examiner.*